United States Patent
Yamaguchi

(10) Patent No.: US 9,187,149 B2
(45) Date of Patent: Nov. 17, 2015

(54) BICYCLE DERAILLEUR WITH ROTATION RESISTANCE AND RESISTANCE CONTROL

(75) Inventor: Sota Yamaguchi, Sakai (JP)

(73) Assignee: SHIMANO, INC., Sakai (JP)

( * ) Notice: Subject to any disclaimer, the term of this patent is extended or adjusted under 35 U.S.C. 154(b) by 659 days.

(21) Appl. No.: 13/456,539

(22) Filed: Apr. 26, 2012

(65) Prior Publication Data

US 2013/0288834 A1 Oct. 31, 2013

(51) Int. Cl.
| | |
|---|---|
| *B62M 9/124* | (2010.01) |
| *B62M 9/1246* | (2010.01) |
| *B62M 9/1248* | (2010.01) |
| *B62M 9/1244* | (2010.01) |
| *B62M 9/126* | (2010.01) |

(52) U.S. Cl.
CPC ............ *B62M 9/1244* (2013.01); *B62M 9/126* (2013.01); *B62M 9/1248* (2013.01)

(58) Field of Classification Search
CPC ... B62M 9/124; B62M 9/1246; B62M 9/1248
USPC .......................................... 474/77, 78, 79, 80
See application file for complete search history.

(56) References Cited

U.S. PATENT DOCUMENTS

| | | | | |
|---|---|---|---|---|
| 4,406,643 | A | * | 9/1983 | Shimano .......................... 474/82 |
| 4,552,546 | A | * | 11/1985 | Ishikawa .......................... 474/82 |
| 4,692,131 | A | * | 9/1987 | Nagano ............................ 474/80 |
| 6,135,904 | A | * | 10/2000 | Guthrie ........................... 474/82 |
| 2007/0219029 | A1 | * | 9/2007 | Turner ............................ 474/80 |
| 2009/0054183 | A1 | * | 2/2009 | Takachi et al. .................. 474/80 |
| 2009/0291789 | A1 | * | 11/2009 | Ishikawa et al. ................ 474/82 |
| 2012/0083371 | A1 | | 4/2012 | Yamaguchi et al. | |

* cited by examiner

*Primary Examiner* — William E Dondero
*Assistant Examiner* — Mark K Buse
(74) *Attorney, Agent, or Firm* — James A. Deland

(57) ABSTRACT

A bicycle derailleur comprises a base member adapted to be mounted to a bicycle, a movable member movably coupled to the base member, a chain guide coupled to the movable member for rotation around a rotational axis, a resistance applying element that applies resistance to rotational movement of the chain guide, and a resistance control element. The resistance control element applies a force to the resistance applying element in a direction that is non-parallel with the rotational axis, without any manual operations, to prevent a reduction in the resistance to rotational movement of the chain guide applied by the resistance applying element.

25 Claims, 15 Drawing Sheets

BICYCLE DERAILLEUR WITH ROTATION RESISTANCE AND RESISTANCE CONTROL

BACKGROUND OF THE INVENTION

The present invention is directed to bicycle transmission devices and, more particularly, to a bicycle derailleur with rotation resistance.

A typical bicycle derailleur transmission includes a plurality of sprockets that rotate together with a front crank or with a rear wheel, a chain, and a derailleur that selectively shifts the chain among the plurality of sprockets. A typical derailleur includes a base member adapted to be mounted to the bicycle frame, a movable member movably coupled to the base member, and a chain guide coupled to the movable member. The chain guide engages the chain to selectively switch the chain among the plurality of sprockets when the movable member moves relative to the base member.

The chain guide of a rear derailleur ordinarily is rotatably mounted to the movable member and is spring-biased in a clockwise direction (when viewed from the right side of the bicycle) so that the chain guide can take up the slack in the chain when the chain engages the smaller-diameter sprockets. However, during rough riding, bumps and shocks may cause the chain guide to rotate counterclockwise, thereby creating undesirable slack in the chain. To prevent this from occurring, motion resisting structures have been added to some rear derailleurs. An example of a motion resisting structure is disclosed in U.S. Patent Application Publication Number 2009/0054183 A1. As shown therein, a bicycle derailleur comprises a base member adapted to be mounted to a bicycle, a movable member movably coupled to the base member, and a chain guide coupled to the movable member. The chain guide is coupled for rotation around a rotational axis, and a biasing element biases the chain guide in a selected rotational direction around the rotational axis. A resistance applying unit applies a resistance to rotational movement of the chain guide in a direction opposite the selected rotational direction, and an adjusting unit adjusts an amount of resistance applied by the resistance applying unit.

SUMMARY OF THE INVENTION

The present invention is directed to various features of a bicycle transmission. In one embodiment, a bicycle derailleur comprises a base member adapted to be mounted to a bicycle, a movable member movably coupled to the base member, a chain guide coupled to the movable member for rotation around a rotational axis, a resistance applying element that applies resistance to rotational movement of the chain guide, and a resistance control element. The resistance control element applies a force to the resistance applying element in a direction that is non-parallel with the rotational axis, without any manual operations, to prevent a reduction in the resistance to rotational movement of the chain guide applied by the resistance applying element. Additional inventive features will become apparent from the description below, and such features alone or in combination with the above features and their equivalents may form the basis of further inventions as recited in the claims.

DETAILED DESCRIPTION OF THE EMBODIMENTS

Figure 1:
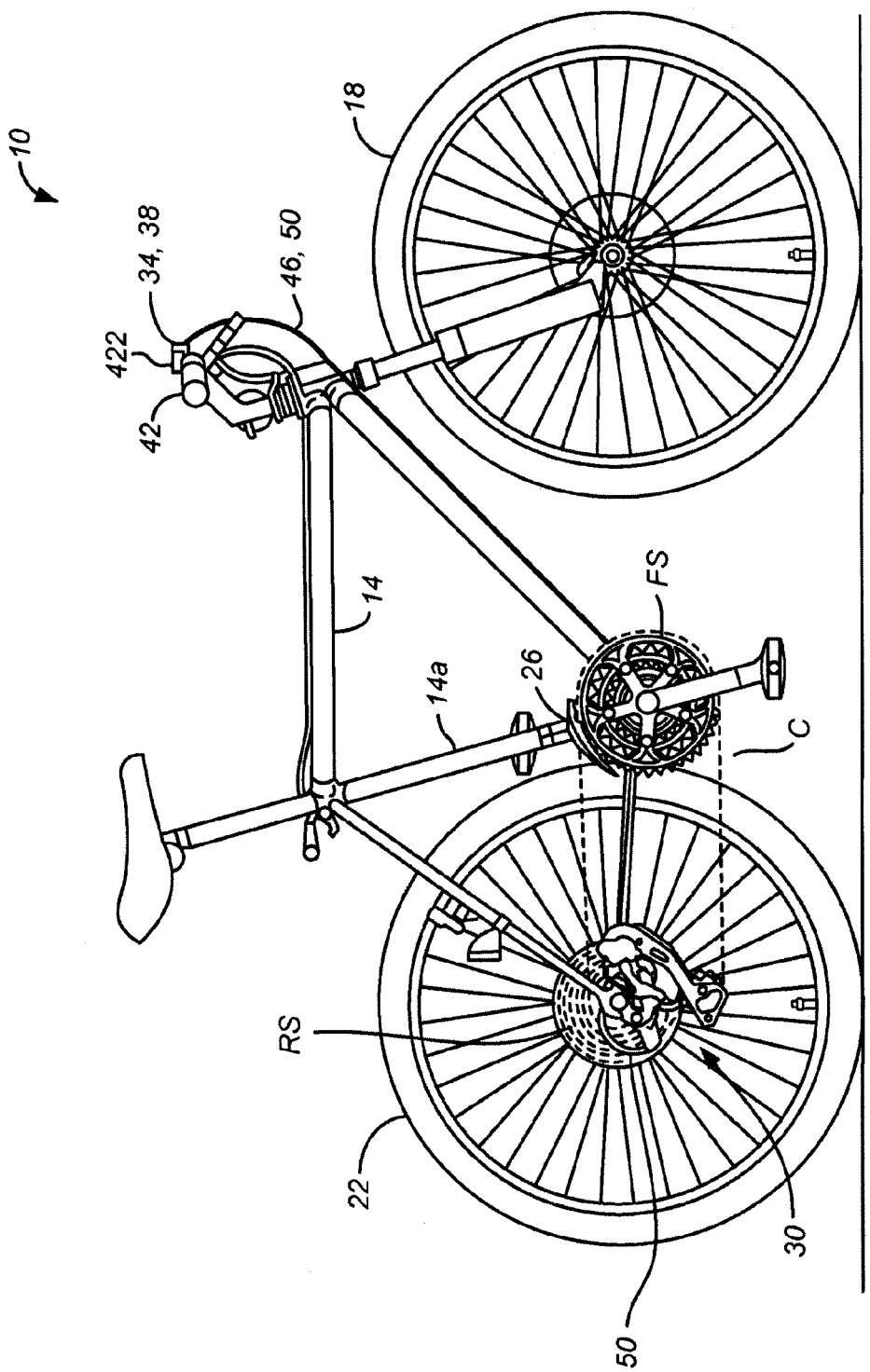
FIG. 1 is a side view of a bicycle that employs a particular embodiment of a derailleur bicycle transmission.

FIG. 1 shows a bicycle 10 comprising a frame 14 with front and rear wheels 18 and 22 rotatably coupled to frame 14 in a conventional manner. A front derailleur 26 is mounted to a seat tube 14a of frame 14, and a rear derailleur 30 is mounted to the rear of frame 14. Front derailleur 26 switches a chain C among a plurality of front sprockets FS, and rear derailleur 30 switches chain C among a plurality of rear sprockets RS. Conventional shift control devices 34 and 38, mounted to a handlebar 42, are used to control the operation of front derailleur 26 and rear derailleur 30, respectively, through conventional Bowden cables 46 and 50. Bicycle 10 is a conventional bicycle except for rear derailleur 30, so only rear derailleur 30 will be discussed in further detail.

Figure 2:
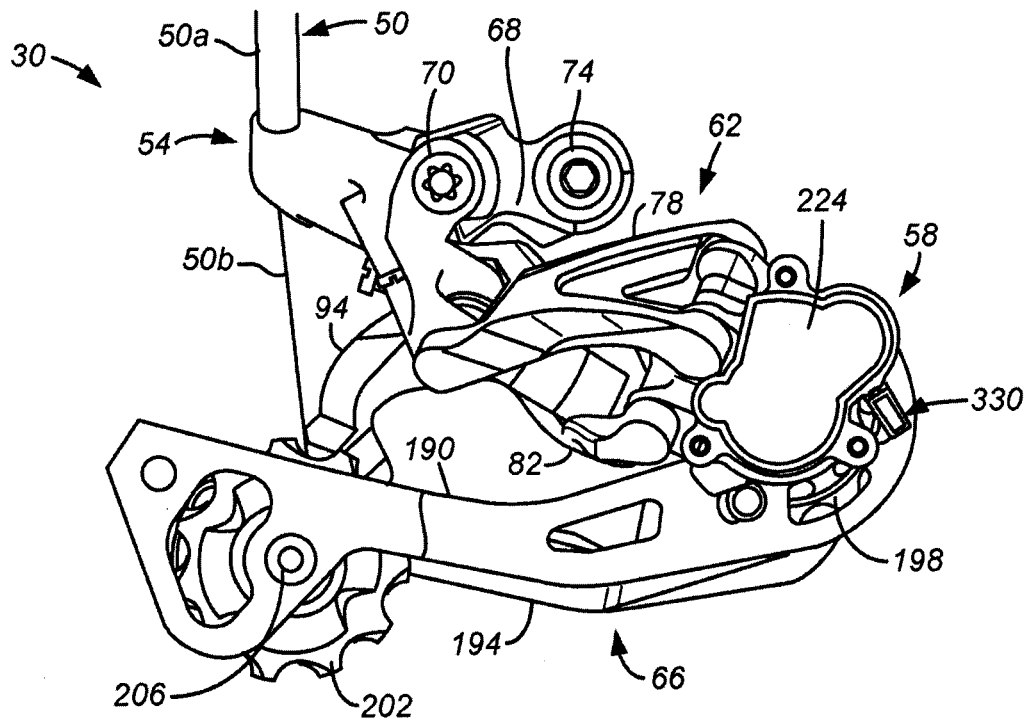
FIG. 2 is a side view of a particular embodiment of a rear derailleur.

As shown in FIG. 2, rear derailleur 30 comprises a base member 54, a movable member 58, a linkage assembly 62 and a chain guide 66. Base member 54 is structured to be rotatably mounted to a rear derailleur mounting member 68 through a mounting bolt 70, and linkage assembly 62 is coupled between base member 54 and movable member 58 so that chain guide 66 can move to a plurality of shift positions corresponding to the number of rear sprockets RS. Rear derailleur mounting member 68 is structured to be fixedly mounted to the rear of frame 14 through a mounting bolt 74. A return spring (not shown) biases movable member 58 either laterally inwardly or laterally outwardly, depending upon the application, relative to the plurality of rear sprockets RS. In this embodiment, the return spring biases movable member 58 laterally outwardly.

Figure 3:
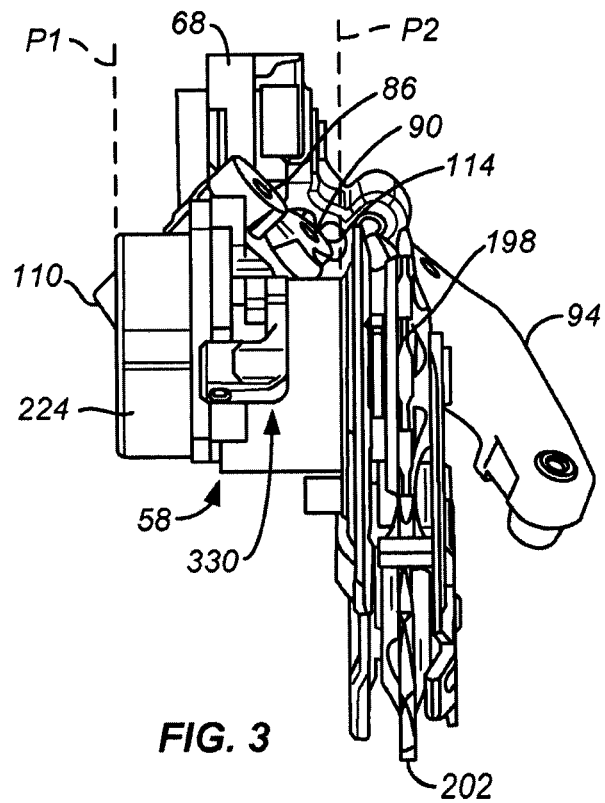
FIG. 3 is a front view of the derailleur shown in FIG. 2.

Linkage assembly 62 includes a pair of parallel links 78 and 82. Link 78 is an upper/outer link, while link 82 is a lower/inner link. Links 78 and 82 are pivotally coupled to base member 54 through pivot pins (not shown), and links 78 and 82 are pivotally coupled to movable member 58 through pivot pins 86 and 90 (FIG. 3). A derailleur actuating arm 94 extends rearwardly from a lower side of link 82. An outer casing 50a of Bowden cable 50 is terminated at base member 54 in a conventional manner, and an inner wire 50b of Bowden cable 50 is attached to actuating arm 94 in a conventional manner.

Figure 4:
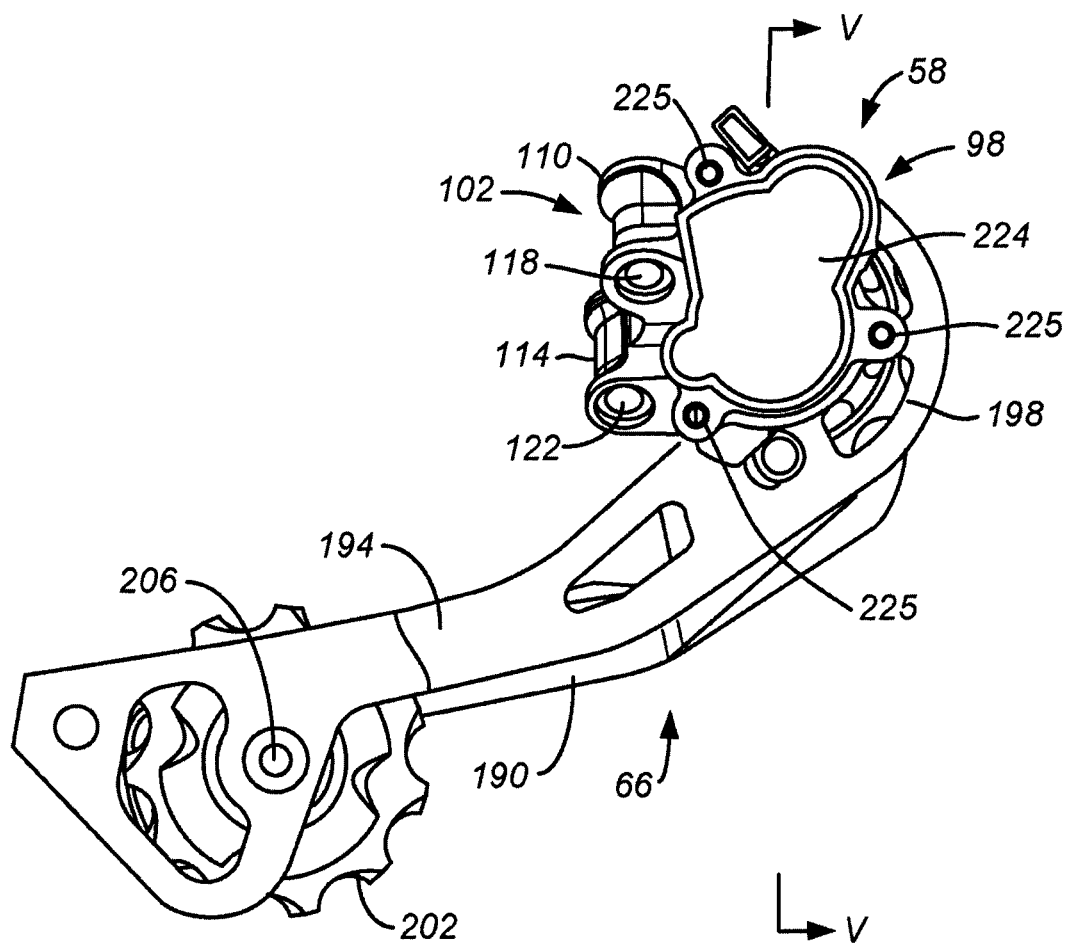
FIG. 4 is a side view of the movable member and chain guide detached from the rest of the derailleur.
Figure 5:
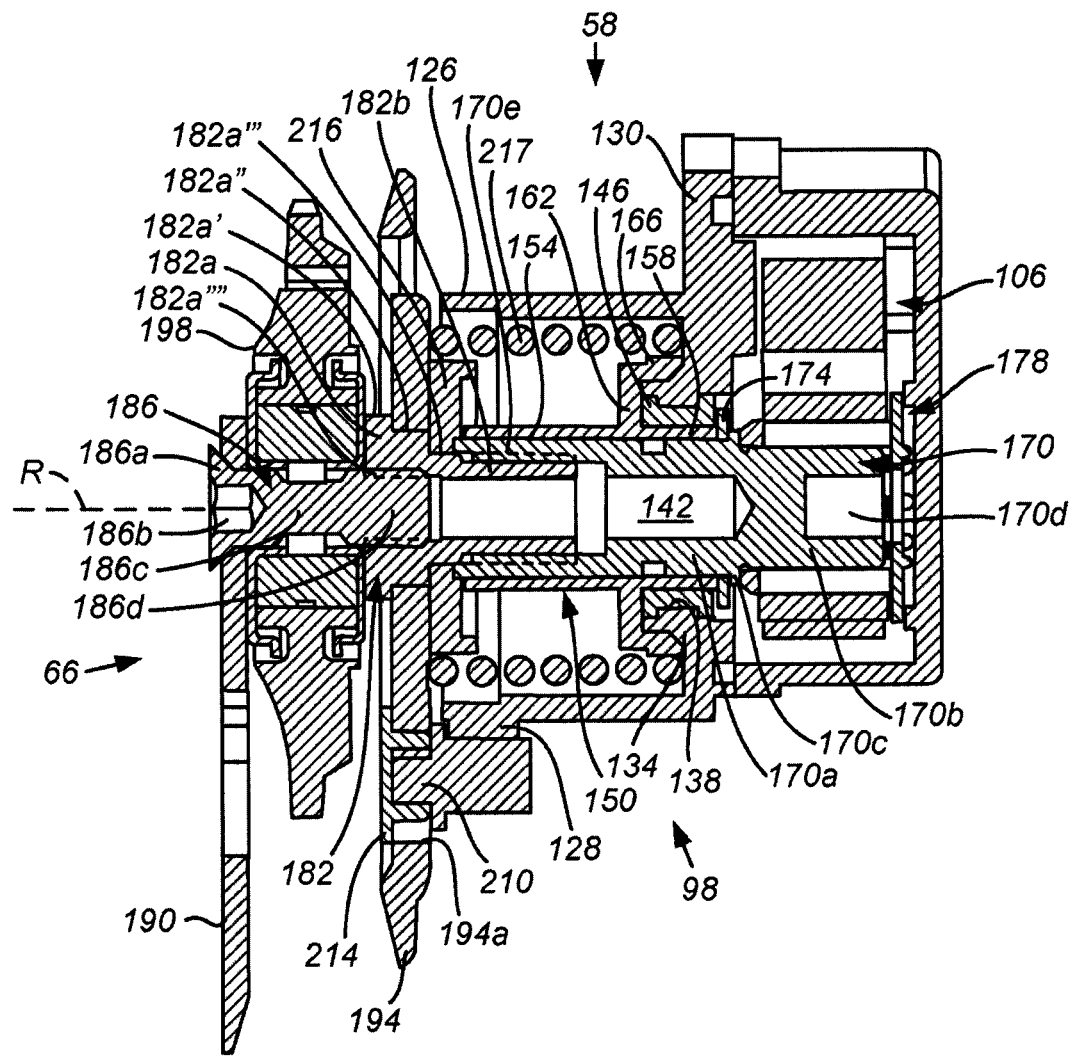
FIG. 5 is a cross-sectional view taken along line V-V in FIG. 4.

As shown in FIGS. 4 and 5, movable member 58 comprises a housing 98 and a link attachment portion 102. Housing 98 is fixedly attached to (e.g., integrally formed with) link attachment portion 102 and houses a portion of a resistance applying element 106 that is discussed in further detail below. Link attachment portion 102 comprises a pair of tubular link mounting ears 110 and 114 which have corresponding cylindrical openings 118 and 122 for receiving respective pivot shafts 86 and 90 therein.

Housing 98 comprises a generally tubular portion 126, a plate guiding ear 128 and a resistance element mounting flange 130. A radially inner portion of resistance element mounting flange 130 forms a mounting ledge 134 having an inner peripheral surface 138 that defines a mounting bore 142. A tubular bushing 146 is attached to the inner peripheral surface 138 of mounting ledge 134 so as to be disposed within mounting bore 142. A tubular shaft bearing 150 is attached to mounting ledge 134 and to tubular bushing 146. More specifically, shaft bearing 150 comprises a tubular first section 154, a tubular second section 158, a radially outwardly extending flange section 162, and a tubular mounting collar 166. Second section 158 is disposed radially within and contacts tubular bushing 146. Flange section 162 extends radially outwardly at a junction between first section 154 and second section 158, and mounting collar 166 extends axially from the outer end of flange section 162 (to the right in FIG. 5). Mounting collar 166 surrounds and contacts mounting ledge 134.

Figure 6:
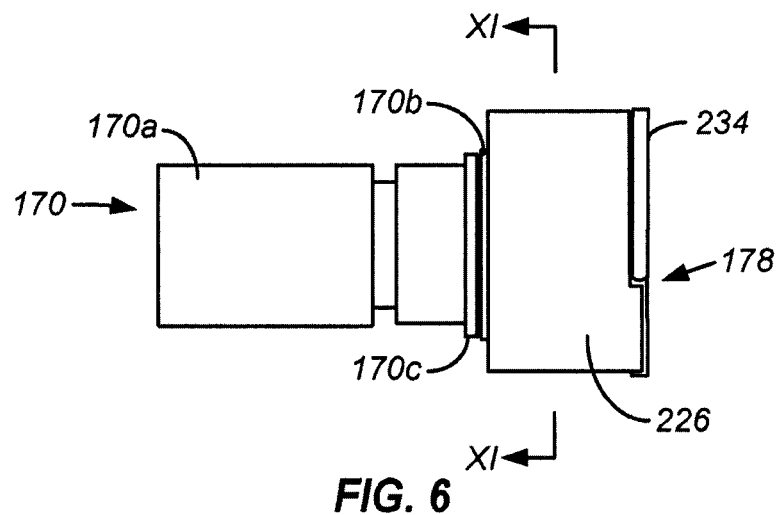
FIG. 6 is a front view of the pivot shaft and the roller clutch for the chain guide.

A pivot shaft 170 is disposed within shaft bearing 150. As shown in FIGS. 5 and 6, pivot shaft 170 includes a first portion 170a, a reduced-diameter second portion 170b and a radially outwardly extending retainer shoulder 170c disposed at a junction between first portion 170a and second portion 170b. First portion 170a is disposed within shaft bearing 150, and second portion 170b extends axially from resistance element mounting flange 130 (to the right in FIG. 5). A retainer washer 174 is fitted between retainer shoulder 170c and shaft bearing 150. In this embodiment, second portion 170b of pivot shaft 170 forms part of a one-way clutch 178 of resistance applying element 106. Pivot shaft 170 also includes a hexagonal tool-engaging opening 170d on the right end thereof and a threaded inner peripheral surface 170e on the left end thereof.

Chain guide 66 is mounted to pivot shaft 170 through a chain guide interface shaft 182 and a chain guide mounting shaft 186 for rotation around a rotational axis R. As shown in FIGS. 4 and 5, chain guide 66 includes a first chain guide plate 190, a second chain guide plate 194, a guide pulley 198 rotatably supported between first chain guide plate 190 and second chain guide plate 194 by chain guide mounting shaft 186, and a tension pulley 202 rotatably supported between first chain guide plate 190 and second chain guide plate 194 by a pivot shaft 206 that is connected to first chain guide plate 190 and to second chain guide plate 194. As shown in FIG. 5, chain guide interface shaft 182 includes a head portion 182a and a threaded shaft portion 182b. Threaded shaft portion 182b screws into the threaded inner peripheral surface 170e of pivot shaft 170 so that pivot shaft 170 and chain guide interface shaft 182 rotate together as an integral unit. Head portion 182a has the form of a three-step head including a first step portion 182a', a second step portion 182a" and a third step portion 182a'". First step portion 182a' functions as a spacer between guide pulley 198 and second chain guide plate 194, and second step portion 182a" fixedly supports second chain guide plate 194. Second chain guide plate 194 includes an arcuate guide slot 194a that receives a threaded shaft 210 and a bearing nut 214 therein. Threaded shaft 210 extends axially from plate guiding ear 128 of tubular portion 126 of housing 98. Third step portion 182a'" supports a cap member 216 that helps to prevent contaminants from entering tubular portion 126 of housing 98. Finally, head portion 182 includes a threaded inner peripheral surface 182a"".

Chain guide mounting shaft 186 includes a head portion 186a with a hexagonal tool-engaging opening 186b, an intermediate pivot shaft portion 186c and a threaded end portion 186d. Head portion 186a fixedly supports first chain guide plate 190, and intermediate pivot shaft portion 186c rotatably supports guide pulley 198. Threaded end portion 186d screws into the threaded inner peripheral surface 182a" of chain guide interface shaft 182 so that pivot shaft 170, chain guide interface shaft 182, chain guide mounting shaft 186, first chain guide plate 190 and second chain guide plate 194 rotate together as an integral unit. A coil spring 217 has a first end mounted to resistance element mounting flange 130 and a second end mounted to second chain guide plate 194 to bias chain guide 66 in the clockwise direction and thereby take up slack in chain C.

As shown in FIGS. 7-10, resistance applying element 106 includes one-way clutch 178 and a friction applying member 218. One-way clutch 178 applies resistance to rotational movement of chain guide 66 in a predetermined direction, and friction applying member 218 applies frictional resistance to rotational movement of chain guide 66 by applying frictional resistance to the rotation of one-way clutch 178. A protective cover 224 is mounted to resistance element mounting flange 130 through screws 225 to protect the enclosed components from the outside environment.

As shown in FIGS. 6 and 9-12, one-way clutch 178 comprises an inner member in the form of second portion 170b of pivot shaft 170, an outer member 226, a plurality of rollers 230 and a roller retainer 234. Thus, in this embodiment, one-way clutch 178 is a roller clutch. As shown more clearly in FIG. 11, second portion 170b of pivot shaft 170 has a smooth circular outer peripheral surface 170f for supporting the plurality of rollers 230. On the other hand, outer member 226 has an inner peripheral surface 226a and a plurality of cam ramps 226b that extend radially outwardly from inner peripheral surface 226a. Each cam ramp 226b is associated with one of the plurality of rollers 230.

Figure 12:
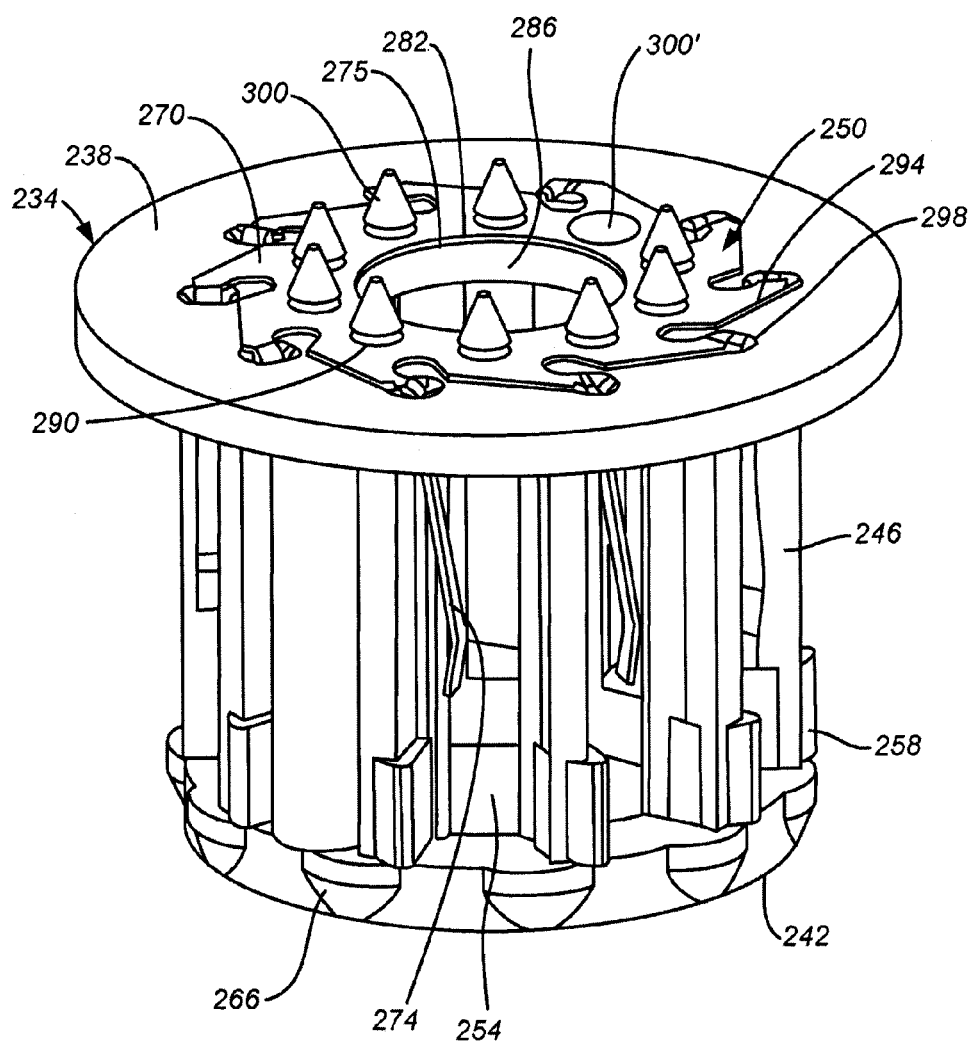
FIG. 12 is a perspective view of a roller retainer for the roller clutch.

Roller retainer 234 is made from a synthetic resin, and it positions each of the plurality of rollers 230 in the proper circumferential position relative to an associated cam ramp 226b and also biases each of the plurality of rollers 230 towards the radially inner portion of its associated cam ramp 226b. As shown in FIG. 12, roller retainer 234 includes an upper retainer ring 238, a lower retainer ring 242, a plurality of retainer columns 246 and a spring assembly 250. The plurality of retainer columns 246 are disposed between and are connected to upper retainer ring 238 and lower retainer ring 242 to form a plurality of roller receiving spaces 254.

Figure 11:
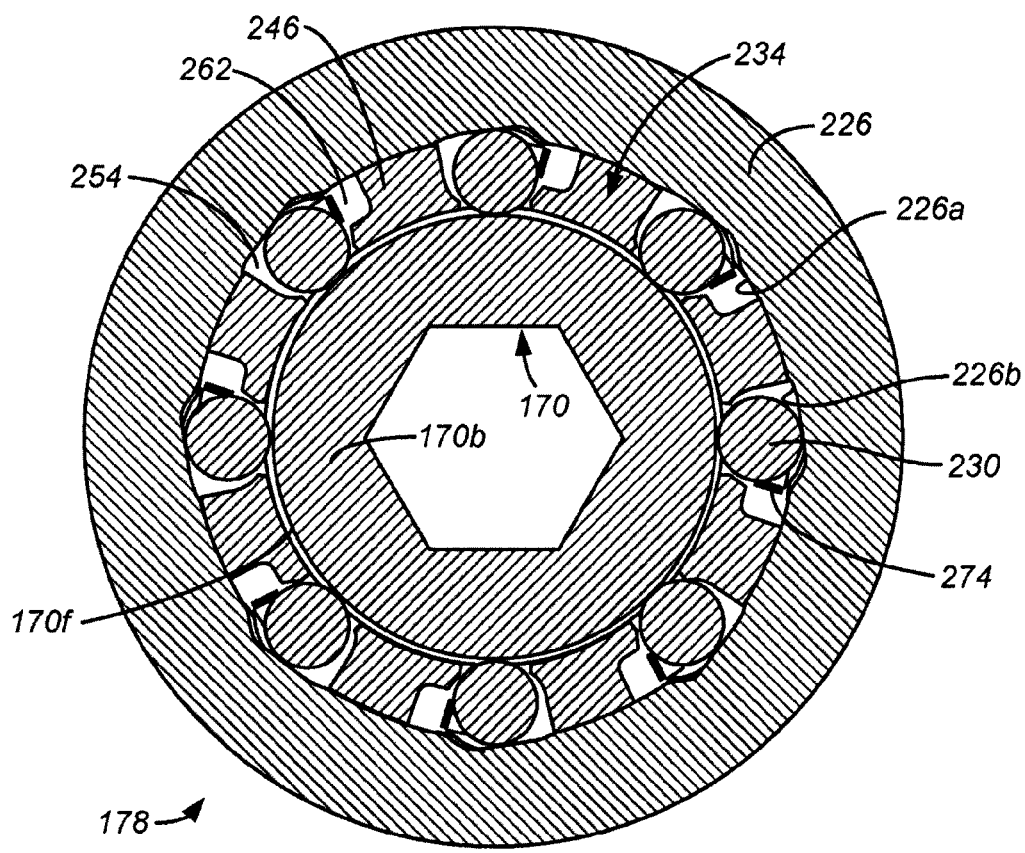
FIG. 11 is a cross-sectional view taken along line XI-XI in FIG. 6.

As shown in FIGS. 11 and 12, each retainer column 246 has a generally reversed L-shaped cross section that forms a spring space 262 between the retainer column and its associated roller 230. Each retainer column 246 includes a generally rectangular, circumferentially-directed rotation stopping projection 258 that engages inner peripheral surface 226a of outer member 226 to prevent reverse rotation of roller retainer 234 (counterclockwise in FIG. 11) relative to outer member 226. Lower retainer ring 242 includes additional projections 266 that engage corresponding recesses (not shown) in outer member 226 to nonrotatably lock roller retainer 234 to outer member 226.

FIG. 12 shows roller retainer 234 in an assembled state immediately prior to the final fastening of spring assembly 250 to upper retainer ring 238. In this embodiment, spring assembly 250 comprises a thin disc-shaped top plate 270 and a plurality of circumferentially disposed leaf springs 274. Top plate 270 fits within a shape-conforming recessed surface 275 formed at the top of upper retainer ring 238. Top plate 270 includes a central opening 282 that aligns with a central opening 286 formed in upper retainer ring 238, a plurality of circumferentially disposed fastener openings 290, and a plurality of spring retaining arms 294 that extend radially outwardly and in a circumferential direction. Each spring retaining arm 294 is attached to (e.g., integrally formed with) a corresponding leaf spring 274 that extends downwardly through a corresponding spring opening 298 in upper retainer ring 238. The leaf spring then extends into a corresponding spring space 262 to bias a corresponding roller 230 (in the counterclockwise direction in FIG. 11). A plurality of fastener posts 300 formed on upper retainer ring 238 extend through the plurality of fastener openings 290 formed in top plate 270. Fastener posts 300 are flattened after assembly as shown at 300' to form rivets that fasten top plate 270 to upper retainer ring 238. As a result, upper retainer ring 238, lower retainer ring 242, the plurality of retainer columns 246 and the plurality of fastener posts 300 are one-piece.

One-way clutch 178 operates in the following manner. When pivot shaft 170 rotates in the clockwise direction in FIG. 11, then the plurality of rollers 230 move to the radially outer portions of the plurality of cam ramps 226b against the biasing forces leaf springs 274. As a result, pivot shaft 170 rotates freely in the clockwise direction relative to outer member 226. On the other hand, when pivot shaft 170 rotates in the counterclockwise direction, then the plurality of rollers 230 move to the radially inner portions of the plurality of cam ramps 226b in accordance with the biasing forces of leaf springs 274. As a result, pivot shaft 170 is nonrotatably coupled to outer member 270 so that pivot shaft 170 and outer member 270 rotate together as a unit.

Figure 9:
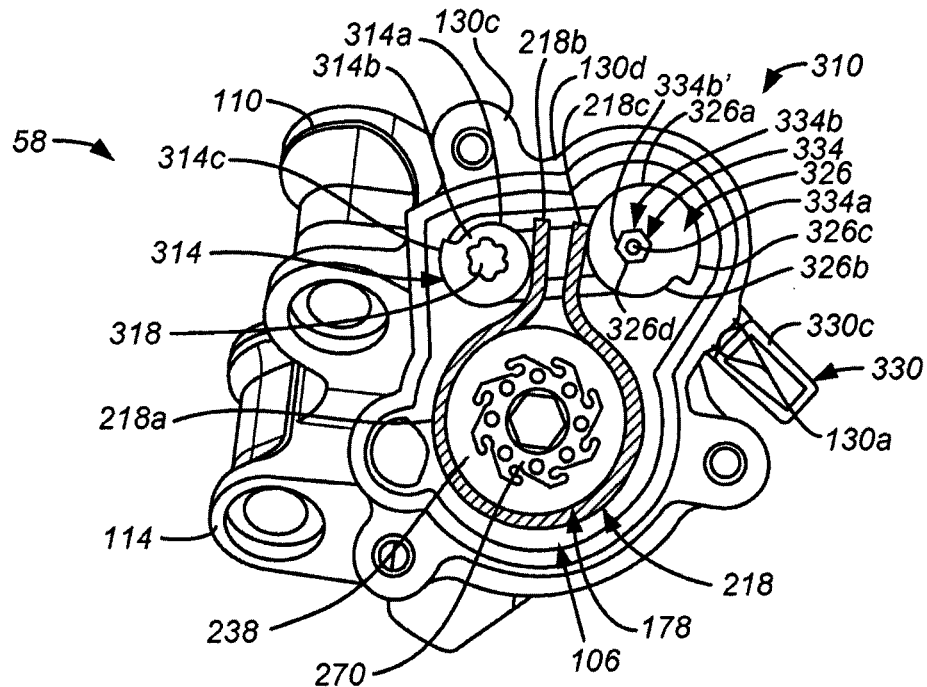
FIG. 9 is a side view of the movable member shown in FIG. 8 with the cover removed.
Figure 10:
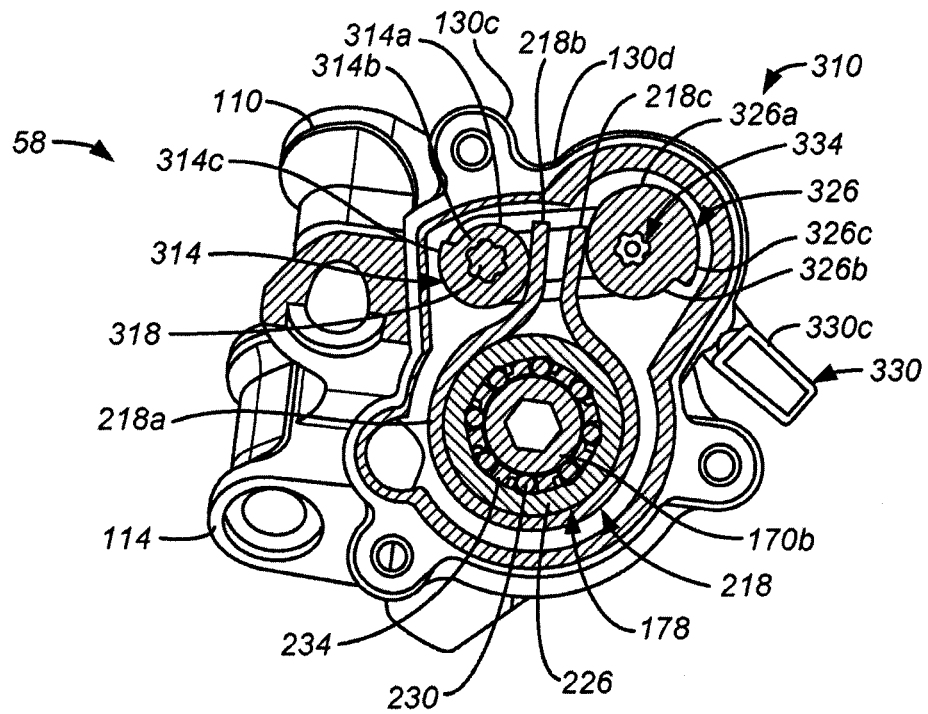
FIG. 10 is a cross-sectional view taken along line X-X in FIG. 8.

As shown in FIGS. 9 and 10, friction applying member 218 comprises a friction-applying portion 218a and two movable end portions 218b and 218c. In this embodiment, friction-applying portion 218a extends circumferentially along the outer peripheral surface of outer member 226 of one-way clutch 178, and movable end portions 218b and 218c extend radially outwardly from opposite ends of friction-applying portion 218a. Friction-applying portion 218a has a band shape with a width approximately equal to the width of outer member 226 of one-way clutch 178. Friction applying member 218 is an elastic member such as a spring member that may be is made from a metal or alloy.

A resistance control unit 310 is provided to control the amount of resistance applied to pivot shaft 170 and chain guide 66 by resistance applying element 106. In this embodiment, resistance control unit 310 comprises resistance control elements such as an initial setting cam 314, a control cam 326 and a control lever 330. Initial setting cam 314 is rotatably mounted to resistance element mounting flange 130 through a shaft 318. Initial setting cam 314 is positioned to contact movable end portion 218b of friction applying member 218. Initial setting cam 314 has a cam surface 314a that includes a radially inner cam surface 314b and a radially outer cam surface 314c. In this embodiment, radially inner cam surface 314b gradually tapers radially outwardly to radially outer cam surface 314c, but cam surface 314a could be stepped or have any other radially changing surface depending upon the application. Preferably, cam surface 314a includes a plurality of surfaces so that the rotational position of initial setting cam 314 is maintained during use of rear derailleur 30. Such surfaces could result from the gradual transition from radially inner cam surface 314b to radially outer cam surface 314c. Alternatively, the surfaces could result from flattened or recessed surfaces on cam surface 314a (such as at radially inner cam surface 314b and radially outer cam surface 314c). Such surfaces could be sufficient to index initial setting cam 314 in predetermined positions so that distinctly more force is required to rotate initial setting cam 314 away from the indexed position. In this embodiment, initial setting cam 314 is non-rotatably but detachably mounted to shaft 316. Shaft 316 includes an undulating or otherwise splined surface so that the orientation of initial setting cam 314 may be adjusted by removing initial setting cam 314 from shaft 316, rotating initial setting cam 314 to a desired position, and then attaching initial setting cam 314 to shaft 316 in the new rotational position.

Control cam 326 and control lever 330 are disposed at movable end portion 218c of friction applying member 218, wherein control cam 326 is non-rotatably coupled relative to control lever 330 by a coupling shaft 334. Coupling shaft 334 passes through resistance element mounting flange 130 so that control lever 330 is disposed outside of movable member 58. As a result, control lever 330 can be manipulated by a user without removing protective cover 224.

Control cam 326 is positioned to contact movable end portion 218c of friction applying member 218. Control cam 326 has a cam surface 326a that includes a radially inner cam surface 326b and a radially outer cam surface 326c. In this embodiment, radially inner cam surface 326b gradually tapers radially outwardly to radially outer cam surface 326c in a non-linear manner, but cam surface 326a could be stepped or have any other radially changing surface depending upon the application. For example, cam surface 326a could include a plurality of surfaces so that the rotational position of control cam 314 is maintained during use of rear derailleur 30. Such surfaces could result from the gradual transition from radially inner cam surface 326b to radially outer cam surface 326c. Alternatively, the surfaces could result from flattened or recessed surfaces on cam surface 326a (such as at radially inner cam surface 326b and radially outer cam surface 326c). Such surfaces could be sufficient to index control cam 326 in predetermined positions so that distinctly more force is required to rotate control cam 326 away from the indexed position.

Figure 7:
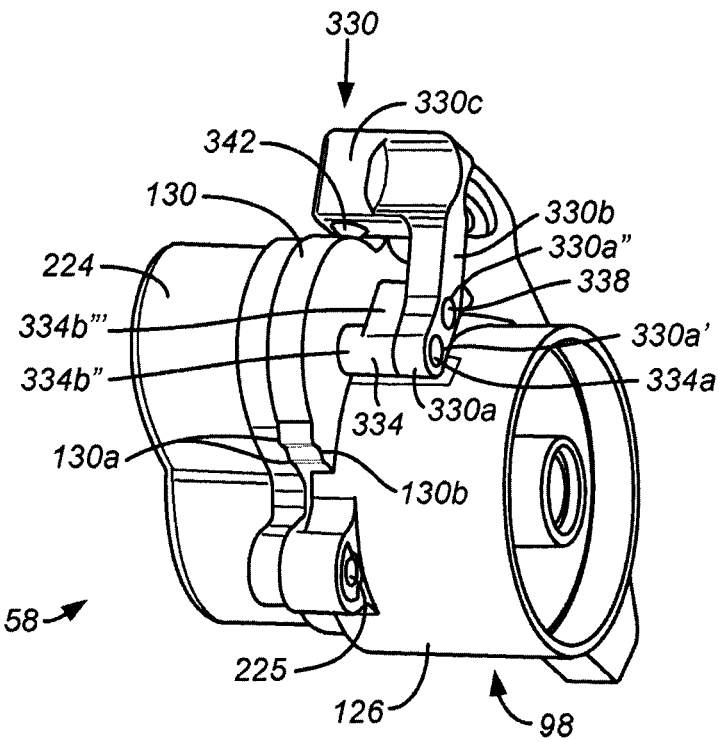
FIG. 7 is a perspective view of the movable member showing the resistance control lever.

As shown in FIGS. 7 and 9, coupling shaft 334 comprises an inner cylindrical shaft core 334a disposed within a coupling member 334b. Coupling member 334b has a splined outer peripheral surface 334b', a tubular section 334b" and a mounting ear 334b'". Splined outer peripheral surface 334b' engages a splined inner peripheral surface 326d of control cam 326 so that control cam 326 and coupling shaft 334 rotate together as a unit. Control cam 326 is detachable from coupling shaft 334. Thus, the rotational position of control cam 326 relative to coupling shaft 334 may be adjusted in the same manner as initial setting cam 314. Tubular section 334b" passes through resistance element mounting flange 130 so that coupling shaft 334 can rotate relative to resistance element mounting flange 130. Mounting ear 334b'" extends generally perpendicularly from tubular section 334b" and radially outwardly from shaft core 334a.

As shown more clearly in FIG. 7, control lever 330 comprises a shaft mounting portion 330a, a radially outwardly extending portion 330b and a finger contact portion 330c. Shaft mounting portion 330a has a first opening 330a' and a second opening 330a", wherein first opening 330a' receives shaft core 334a therein, and second opening 330a" receives a fastener 338 therein for rigidly and nonrotatably attaching control lever 330 to coupling member 334b of coupling shaft 334. Control lever 330 is detachable from coupling shaft 334 when fastener 338 is removed. Control lever 330 may be made from metal (e.g., aluminum) or synthetic resin. Shaft core 334a and coupling member 334b may be formed as one-piece and/or control lever 330 and coupling shaft 334 may be formed as one-piece. Radially outwardly extending portion 330b extends radially outwardly from shaft core 334a and fastener 338, and finger contact portion 330c is disposed at the end of radially outwardly extending portion 330b. Finger contact portion 330c extends generally perpendicularly from radially outwardly extending portion 330b to form a generally rectangular finger paddle that is disposed in close proximity to resistance element mounting flange 130. As shown more clearly in FIGS. 7 and 8, finger contact portion 330c includes a threaded bore 330c' that houses an indexing ball 342 and an indexing spring (not shown). The indexing spring and indexing ball 342 are maintained within bore 330c' by an adjustment screw 346 that may be used to adjust the spring force against indexing ball 342. Alternatively, ball 342 may be formed from an elastic resin such that a part of ball 342 is disposed in an unthreaded bore 330' or otherwise bonded on finger contact portion 330c.

Figure 14:
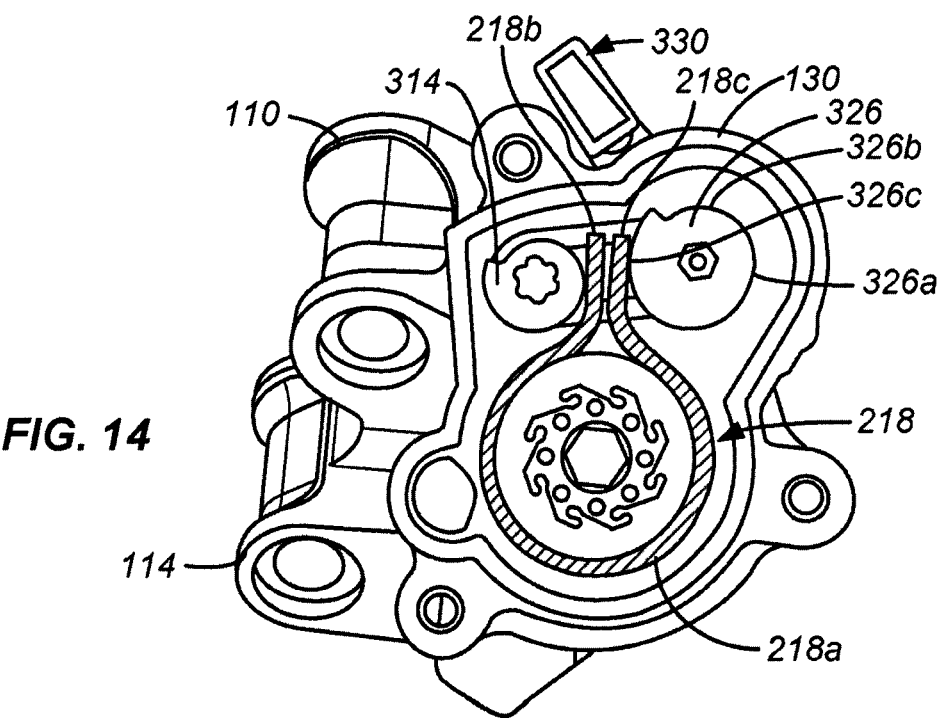
FIG. 14 is a side view of the movable member shown in FIG. 13 with the cover removed.
Figure 15:
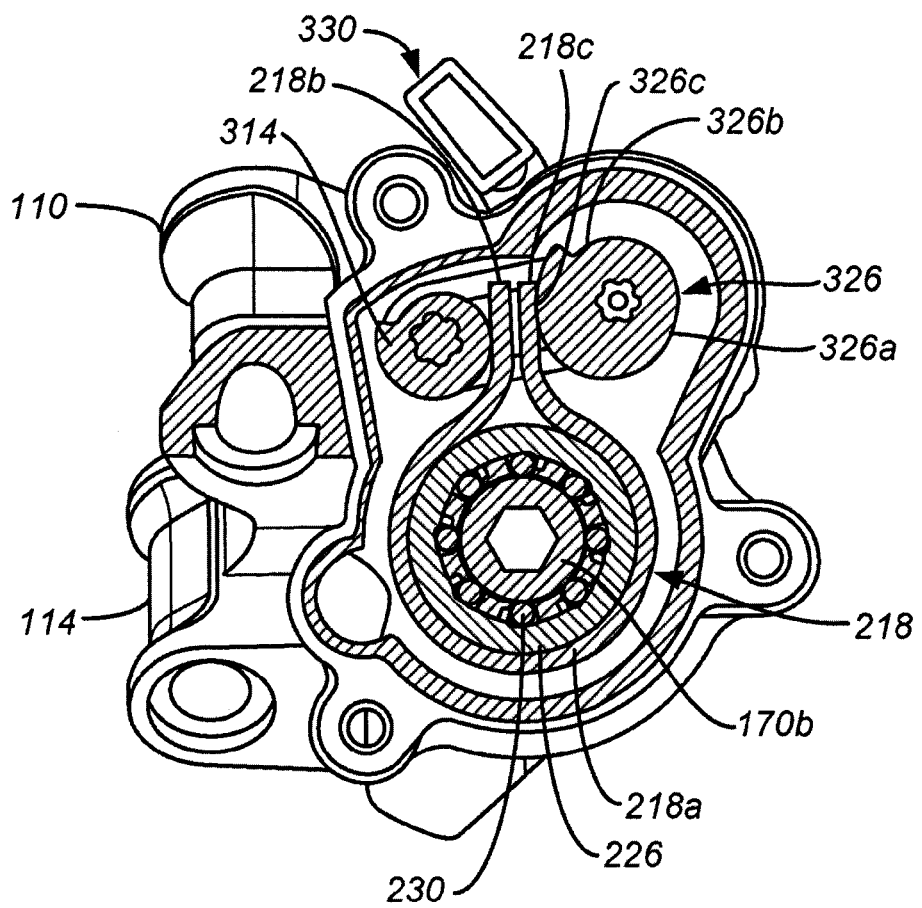
FIG. 15 is a cross-sectional view taken along line XV-XV in FIG. 13.

Resistance element mounting flange 130 forms a pair of indexing projections 130a with an indexing recess 130b therebetween. When control lever 330 is in the position shown in FIGS. 9 and 10, indexing ball 342 is disposed within indexing recess 130b to index control lever 330 in that position. In other words, control lever 330 is stably maintained in that position so that distinctly more force is required to rotate control lever 330 away from that position. Resistance element mounting flange 130 also forms an indexing abutment 130c and an indexing surface 130d. Indexing abutment 130c and indexing surface 130d cooperate with indexing ball 342 to index control lever 330 in the position shown in FIGS. 14 and 15. More specifically, indexing abutment 130c contacts finger contact portion 330c of control lever 330 to limit counterclockwise rotation of control lever 330, and indexing surface 130d has a temporarily increasing radius of curvature immediately to the right of indexing ball 342 (when control lever 330 is disposed in the position shown in FIGS. 14 and 15) so that the indexing spring must be further compressed in order to rotate control lever 330 clockwise. Thus, distinctly more force is required to rotate control lever 330 clockwise away from the position shown in FIGS. 14 and 15. In another embodiment, radially outer cam surface 326c may index control lever 330 instead of indexing abutment 130c and indexing surface 130d. In such an embodiment, when movable end portion 218c of friction applying member 218 moves from radially inner cam surface 326b to radially outer cam surface 326c, or from radially outer cam surface 326c to radially inner cam surface 326b, the surfaces create an audible and/or tactile clicking sensation.

Figure 8:
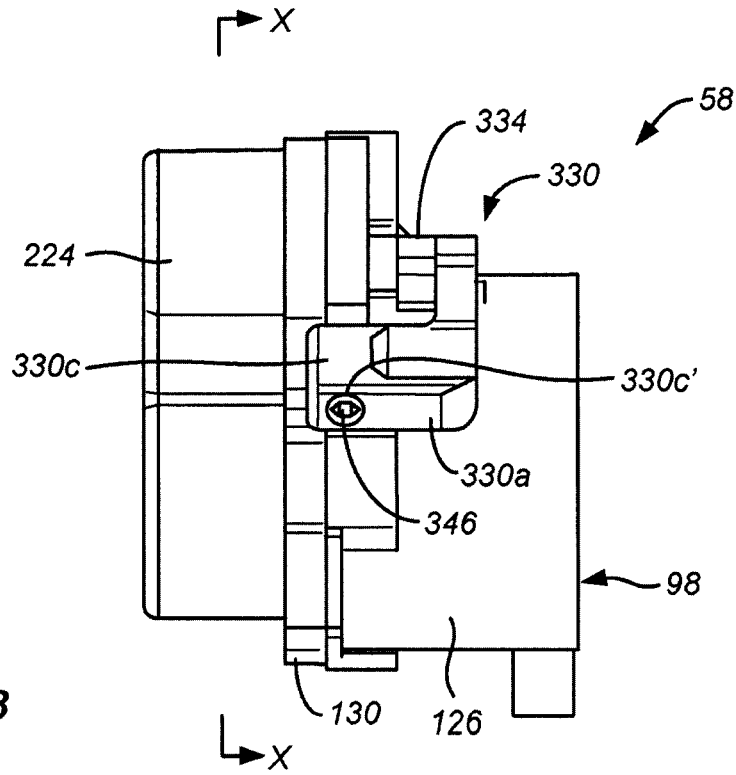
FIG. 8 is a front view of the movable member when the resistance control lever is in a first position.

In operation, control lever 330 is rotated to the position shown in FIGS. 8-10 so that indexing ball 342 is disposed within indexing recess 103b and a radially inner portion of cam surface 326a of control cam 326 contacts movable end portion 218c of friction applying member 218. Alternatively, it is possible that radially inner portion of cam surface 326a of control cam 326 does not contact movable end portion 218c of friction applying member 218 when indexing ball 342 is disposed within indexing recess 103b. Then, protective cover 224 is removed, and initial setting cam 314 is rotated so that movable end portions 218b and 218c of friction applying member 218 are disposed at desired positions to adjust the diameter of friction applying portion 218a of friction applying member 218 to apply a desired initial frictional force to outer member 226 of one-way clutch 178. For example, initial setting cam 314 could be set so that radially inner cam surface 314b contacts movable end portion 218b, wherein radially inner cam surface 314b has a radius such that friction applying portion 218a does not apply operatively noticeable friction to outer member 226 of one-way clutch 178. As a result, one-way clutch 178 rotates freely in both the clockwise and counterclockwise directions, and no additional resistance is applied to the rotation of chain guide 66 in either the clockwise or the counterclockwise direction other than the resistance applied by coil spring 217. Protective cover 224 is re-attached after initial setting cam 314 is set to the desired position.

Normally, however, initial setting cam 314 is set so that a radially outer portion of cam surface 314a causes movable end portion 218b to move toward movable end portion 218c. As a result, the diameter of friction applying portion 218a of friction applying member 218 is reduced to apply light or moderate friction to outer member 226 of one-way clutch 178. Thus, when chain guide 66 rotates clockwise to take up the slack in chain C, rollers 230 in one-way clutch 178 move to the radially outer portions of cam ramps 226b, no resistance is applied to the rotation of pivot shaft 170, and chain guide 66 rotates freely in the clockwise direction. On the other hand, when chain guide 66 attempts to rotate in the counterclockwise direction as a result of rough riding, the counterclockwise rotation of pivot shaft 170 causes rollers 230 in one-way clutch 178 to move toward the radially inner portions of cam ramps 226b, thereby locking pivot shaft 170 to outer member 226 so that pivot shaft 170 and outer member 226 rotate as a unit. However, due to the friction applied by friction applying member 218 to outer member 226, counterclockwise rotation of outer member 226 and pivot shaft 170 is resisted, thereby causing resistance to counterclockwise rotation of chain guide 66.

Figure 13:
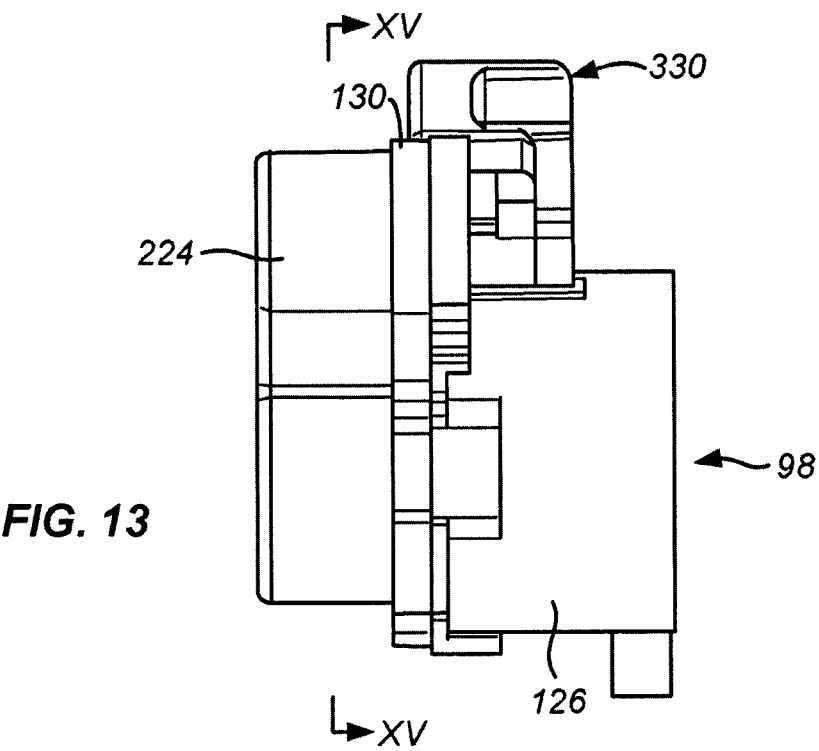
FIG. 13 is a front view of the movable member when the resistance control lever is in a second position.

If the rider expects to be riding in very severe terrain, then additional resistance to counterclockwise rotation of chain guide 66 may be desired. To accommodate such riding, control lever 330 is rotated to the position shown in FIGS. 13-15. The radially outer portion of cam surface 326a of control cam 326 presses movable end portion 218c of friction applying member 218 to the left, thereby further reducing the diameter of friction applying portion 218a of friction applying member 218 and increasing the frictional force applied by friction applying member 218 to outer member 226 of one-way clutch 178. The increased frictional force applied by friction applying member 218 to outer member 226 of one-way clutch 178 further increases the resistance to counterclockwise rotation of pivot shaft 170 and chain guide 66 without affecting the clockwise rotation of chain guide 66.

Figure 16:
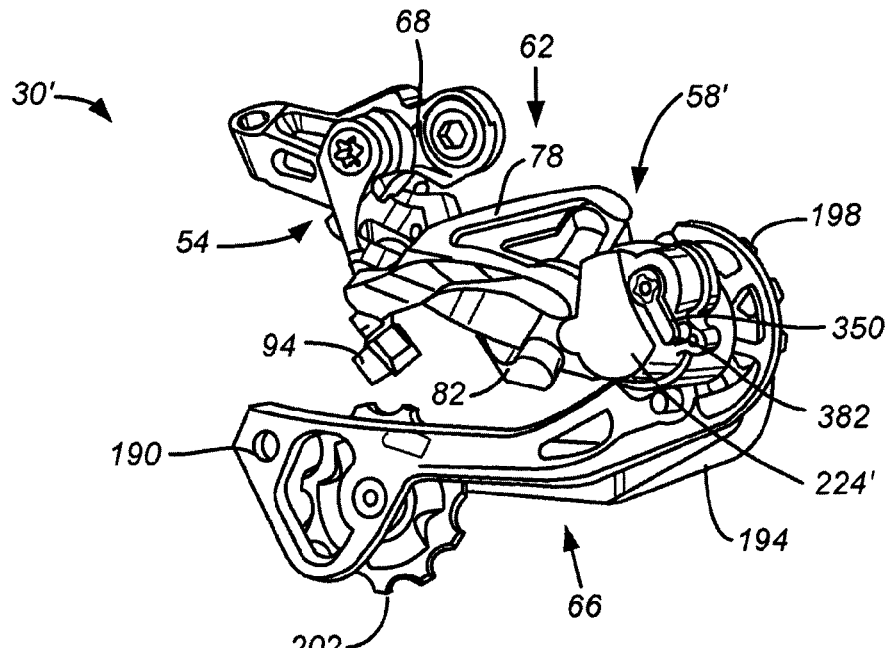
FIG. 16 is a perspective view of another embodiment of a rear derailleur with a resistance control lever in a first position.
Figure 17:
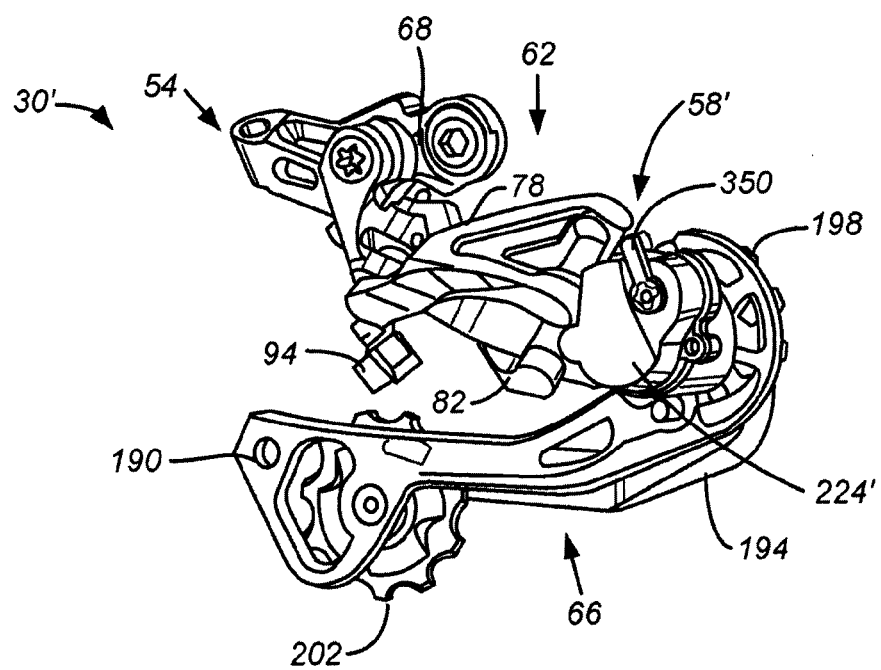
FIG. 17 is a perspective view of the rear derailleur shown in FIG. 16 with the resistance control lever in a second position.

FIGS. 16-22 illustrate another embodiment of a rear derailleur 30' with rotation resistance. This embodiment is the same as the embodiment shown in FIGS. 1-15 except that a control lever 350 for controlling the frictional force applied by friction applying member 218 to outer member 226 of one-way clutch 178 is mounted to the outside of a protective cover 224'. FIG. 16 shows control lever 350 in a first position corresponding to control lever 330 in FIGS. 8-10, and FIG. 17 shows control lever 350 in a second position corresponding to control lever 330 in FIGS. 13-15. The operation is the same as in the first embodiment except as otherwise noted. Thus, only the difference between this embodiment and the first embodiment will be described in detail.

Figure 18:
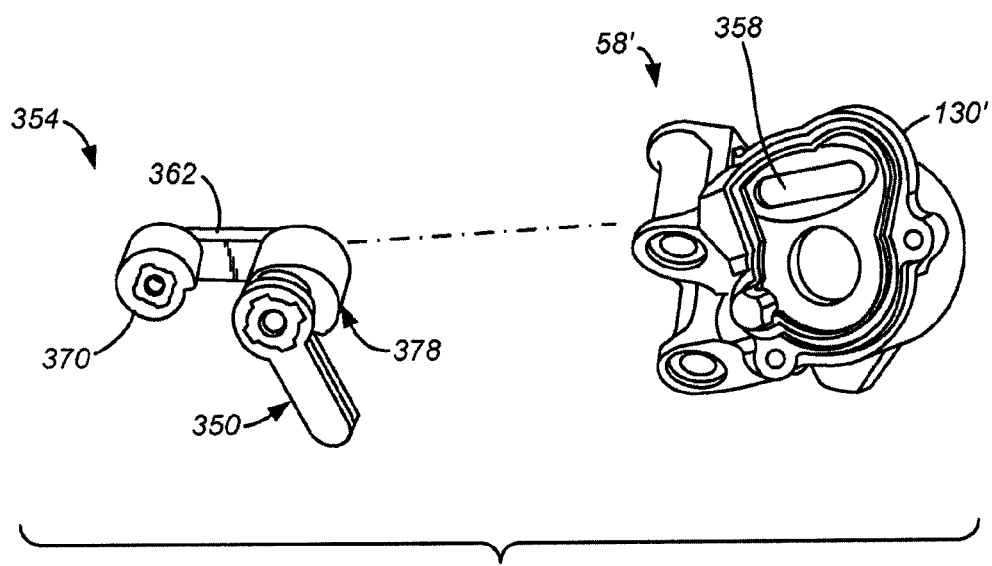
FIG. 18 is a partially exploded view of the movable member and the resistance control mechanism.
Figure 19:
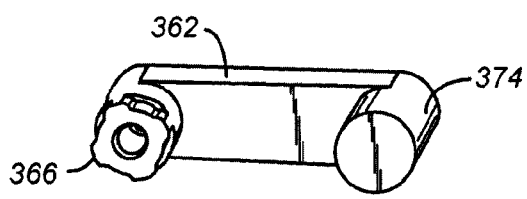
FIG. 19 is a perspective view of a particular embodiment of a cam mounting unit.
Figure 20:
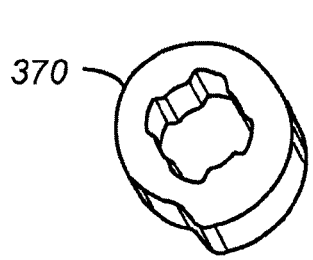
FIG. 20 is a perspective view of a particular embodiment of an initial setting cam.
Figure 21:
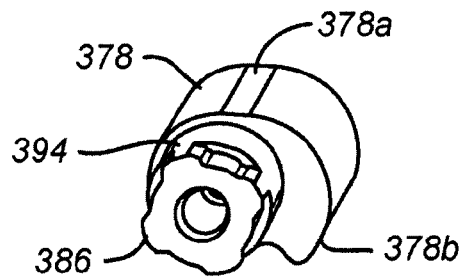
FIG. 21 is a perspective view of a particular embodiment of a control cam.
Figure 22:
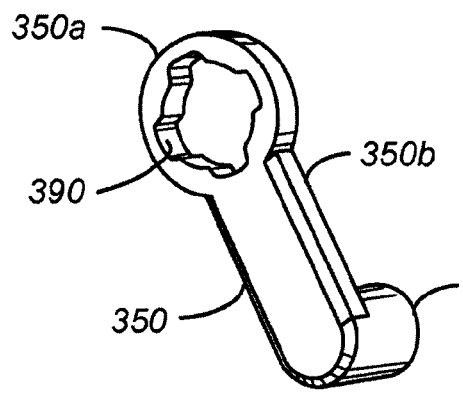
FIG. 22 is a perspective view of a particular embodiment of a control lever.

FIG. 18 is a partially exploded view of a movable member 58' and a resistance control mechanism 354 for this embodiment. A resistance element mounting flange 130' has the same structure as resistance element mounting flange 130 in the first embodiment except for an oval-shaped mounting recess 358 that is substituted for the opening for coupling shaft 334 in the first embodiment. Mounting recess 358 is used to attach resistance control unit 354.

As shown in FIGS. 18-22, resistance control unit 354 comprises a mounting bracket 362, an initial setting cam mounting shaft 366 attached to one end of mounting bracket 362, an initial setting cam 370 mounted to initial setting cam mounting shaft 366, a control cam mounting shaft 374 attached to the other end of mounting bracket 362, a control cam 378 rotatably mounted to control cam mounting shaft 374, and control lever 350 spline-connected to control cam 378. More specifically, control cam 378 includes a plurality of splines 386 that engage a complementary plurality of splines 390 disposed in a cam mounting portion 350a of control lever 350 so that control cam 378 and control lever 350 rotate as a unit around control cam mounting shaft 374. Control cam 378 further includes a bearing portion 394 that engages an opening (not shown) in protective cover 224' so that splines 386, and hence control lever 350, are disposed outside of protective cover 224'. Control lever 350 further includes a radially extending portion 350b and a generally cylindrical finger contact portion 350c that extends perpendicularly from radially extending portion. Initial setting cam 370 is detachable from initial setting cam mounting shaft 366 so that the orientation of initial setting cam 370 may be adjusted by removing initial setting cam 370 from initial setting cam mounting shaft 366, rotating initial setting cam 370 to a desired position, and then attaching initial setting cam 370 to initial setting cam mounting shaft 366 in the new rotational position.

In this embodiment, control cam 378 includes a first surface 378a and a second surface 378b that engage movable end portion 218c of friction applying member 214. First surface 378a and second surface 378b are flattened surfaces that cooperate with movable end portion 218c of friction applying member 284 to index control cam 378, and hence control lever 350, in first and second indexed positions corresponding to two available resistances that resist counterclockwise rotation of chain guide 66. Thus, indexing surfaces on resistance element mounting flange 130' are not required in this embodiment.

Figure 23:
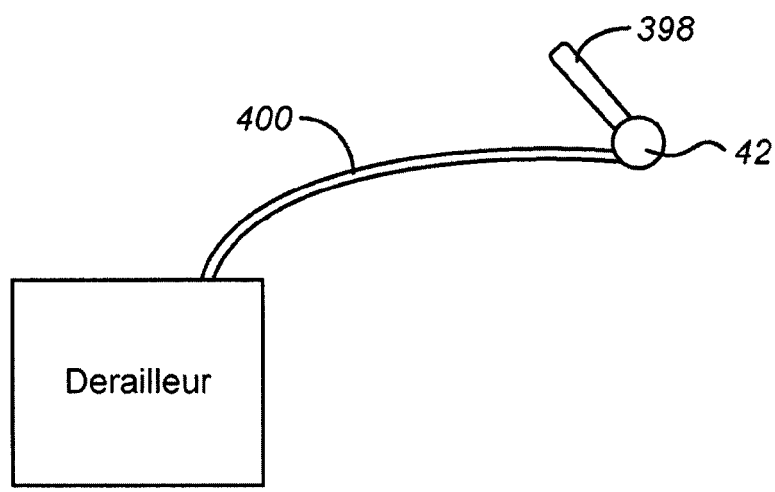
FIG. 23 is a schematic diagram of an alternative embodiment of a resistance control mechanism.

While the above is a description of various embodiments of inventive features, further modifications may be employed without departing from the spirit and scope of the present invention. For example, while control levers 330 and 350 were used to select desired resistances to rotation of chain guide 66, other manually operated members that do not require tools, such as knobs, may be used. While control levers 330 and 350 were mounted at their respective movable members 58 and 58', such a configuration is not necessary. As shown in FIG. 23, a control lever 398 or other manually-operated member could be mounted to handlebar 42 or to some other structure, and control lever 398 could be coupled to a control lever or control disk mounted to the movable member through a control cable such as a Bowden cable 400, wherein the control lever/disk is operatively mounted to the control cam. Friction applying member 218, a part of resistance control unit 310 and one way clutch 178 may be disposed in housing 98 of movable member 58. While the control levers were shown as being located at the laterally inner or outer surfaces of the movable member and cover, the control lever could be disposed anywhere between the laterally inner and outer surfaces defined by the movable member, including any provided cover, such as between planes P1 and P2 in FIG. 3.

Figure 24:
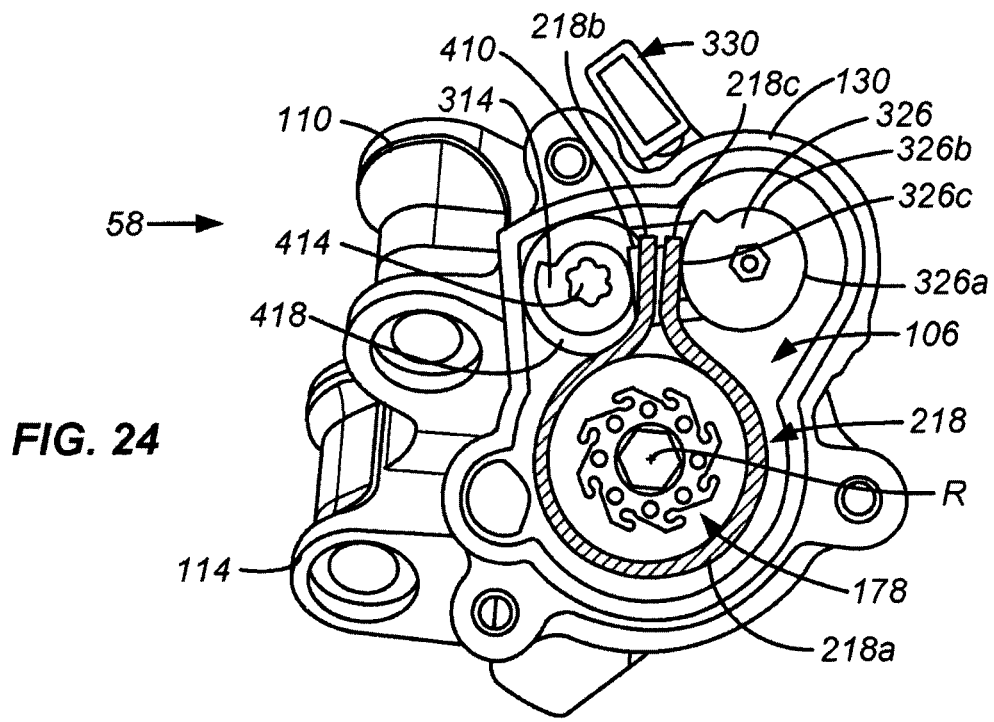
FIG. 24 is a side view of another embodiment of the movable member.

FIG. 24 is a side view of another embodiment of movable member 58. In this embodiment, a force sensor 410 (e.g., a pressure sensor) is disposed between initial setting cam 314 (which functions as a force varying cam in this embodiment) and movable end portion 218b of friction applying member 218, and cam 314 is mounted to an output shaft 414 of a motor 418. Thus, cam 314 engages movable end portion 218b of friction applying member 218 indirectly through force sensor 410 to apply a force to friction applying member 218 that is non-parallel to rotational axis R, and force sensor 410 senses the force applied by cam 314 to friction applying member 218. In this embodiment, motor 418 is controlled by a regulating circuit 422 (FIG. 1) in the form of a cycle computer mounted to handlebar 42. If desired, regulating circuit 422 may be disposed on the rear derailleur. Cam 314, force sensor 410, motor 418 and regulating circuit 422 constitute an example of a resistance control element that prevents a reduction in the resistance to rotational movement of chain guide 66 applied by resistance applying element 106. More specifically, regulating circuit 422 varies the force applied by cam 314 to friction applying member 218 in response to the force sensed by force sensor 410. As a result, cam 314, force sensor 410, motor 418 and regulating circuit 422 vary the resistance applied to one-way clutch 178 by friction applying member 218, and it does so without any manual operations (e.g., automatically).

Figure 25:
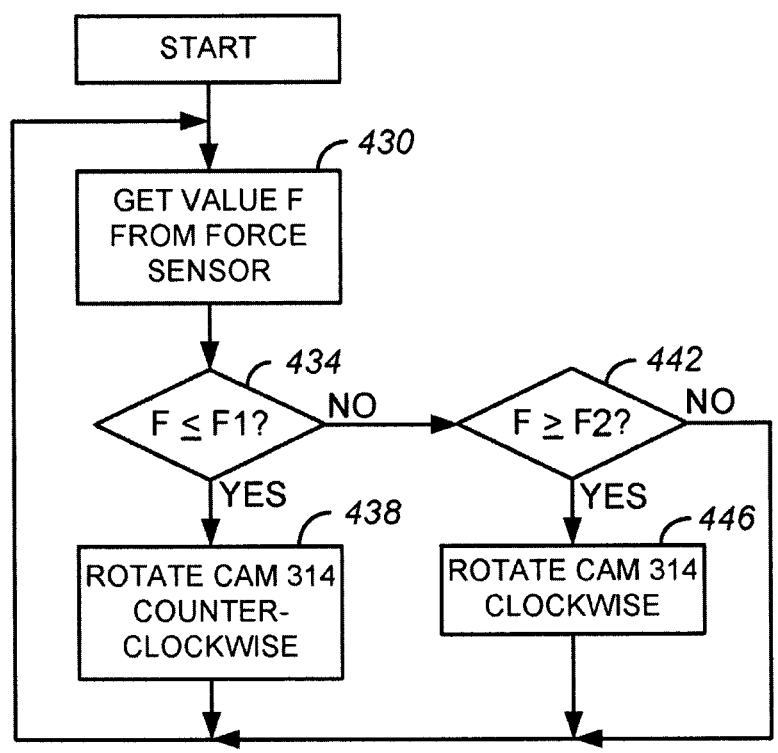
FIG. 25 is a flow chart describing the operation of the cam shown in FIG. 25.

FIG. 25 is a flowchart that describes the operation of this embodiment. Regulating circuit 422 initially obtains a value of the force F sensed by force sensor 410 in a step 430. It is then determined in a step 434 whether the force F is less than or equal to a lower force threshold value F1 stored in a memory in regulating circuit 422 or otherwise calculated by regulating circuit 422. If so, then regulating circuit 422 provides signals to motor 418 in a step 438 to rotate cam 314 counterclockwise, thereby increasing the force applied by cam 314 to movable end portion 218b of friction applying member 218. Thereafter, the process loops back to step 430. If it is determined in step 434 that force F is not less than or equal to threshold value F1, it is then determined in a step 442 whether force F is greater than or equal to a higher force threshold value F2. If so, then regulating circuit 422 provides signals to motor 418 in a step 446 to rotate cam 314 clockwise, thereby decreasing the force applied by cam 314 to movable end portion 218b of friction applying member 218. Thereafter, the process loops back to step 430. If it is determined in step 442 that force F is not greater than or equal to threshold value F2, then the force applied by cam 314 to movable end portion 218b of friction applying member 218 is in the desired range F1<F<F2, and the process loops back to step 430.

Figure 26:
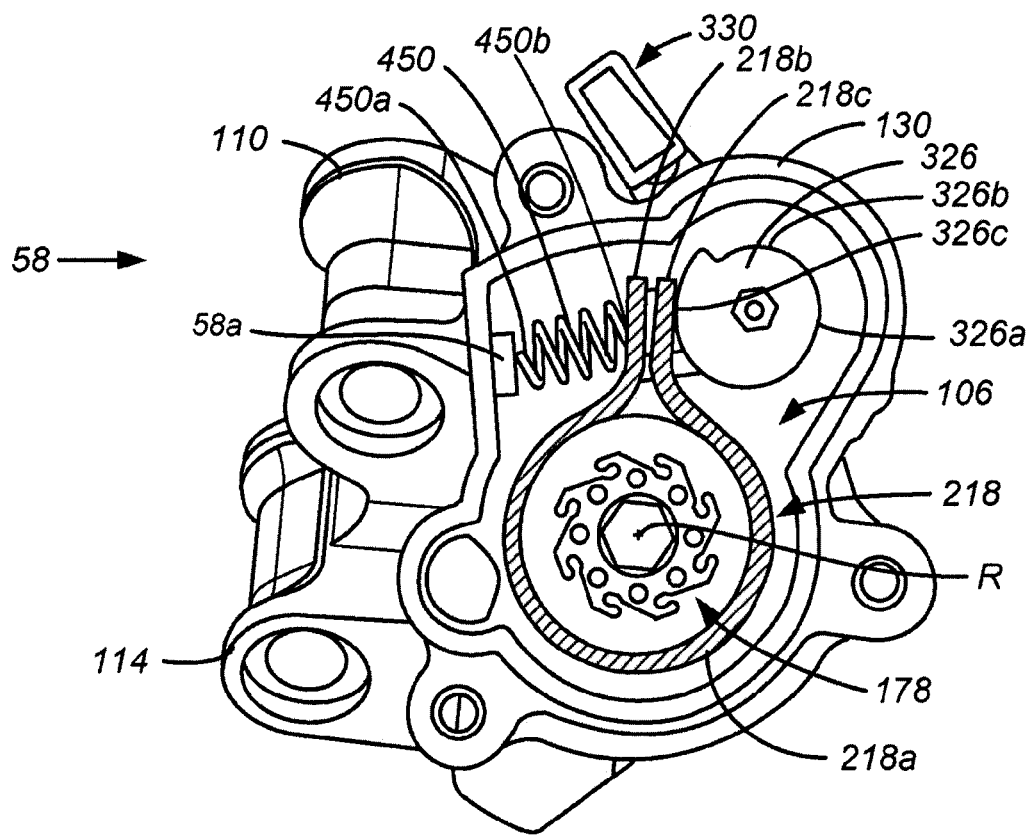
FIG. 26 is a side view of another embodiment of the movable member.

FIG. 26 is a side view of another embodiment of movable member 58 that includes another embodiment of a resistance control element that prevents a reduction in the resistance to rotational movement of chain guide 66 applied by resistance applying element 106. In this embodiment, initial setting cam 314 is replaced by a spring 450 that has spring ends 450a and 450b, wherein spring end 450a engages an abutment 58a of movable member 58, and spring end 450b engages movable end portion 218b of friction applying member 218 to apply a force to friction applying member 218 that is non-parallel to rotational axis R. In this embodiment, spring 450 is a coil spring under compression so that spring 450 pushes movable end portion 218b towards movable end portion 218c. Spring 450 constitutes another example of a resistance control element that applies a variable force to resistance applying element 106 without any manual operations (e.g., automatically).

The size, shape, location or orientation of the various components may be changed as desired. Components that are shown directly connected or contacting each other may have intermediate structures disposed between them. Separate components may be combined, and vice versa. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Terms of degree such as "substantially," "about" and "approximately" as used herein include a reasonable amount of deviation of the modified term such that the end result is not significantly changed. Thus, the scope of the invention should not be limited by the specific structures disclosed or the apparent initial focus or emphasis on a particular structure or feature.

What is claimed is:

1. A bicycle derailleur comprising:
    a base member adapted to be mounted to a bicycle;
    a movable member movably coupled to the base member;
    a chain guide coupled to the movable member for rotation around a rotational axis;
    a resistance applying element that applies resistance to rotational movement of the chain guide; and
    a resistance control element that applies a force to the resistance applying element in a direction that is non-parallel with the rotational axis, without any manual operations, to prevent a reduction in the resistance to rotational movement of the chain guide applied by the resistance applying element.

2. The derailleur according to claim 1 wherein the resistance control element comprises a spring member.

3. The derailleur according to claim 1 wherein the resistance control element comprises a cam member.

4. The derailleur according to claim 1 wherein the resistance control element comprises:
    a force sensor that senses a force applied by the resistance control element to the resistance applying element; and
    a regulating circuit that varies the force applied by the resistance control element to the resistance applying element in response to the force sensed by the force sensor.

5. The derailleur according to claim 4 wherein the resistance control element further comprises a cam member.

6. The derailleur according to claim 5 wherein the resistance control element further comprises a motor that rotates the cam member in response to signals from the regulating circuit.

7. The derailleur according to claim 1 wherein the resistance applying element comprises a friction applying member that applies frictional resistance to rotational movement of the chain guide.

8. The derailleur according to claim 7 wherein the friction applying member comprises a first spring member.

9. The derailleur according to claim 8 wherein the first spring member extends circumferentially about the rotational axis and has a first movable end portion and a second movable end portion.

10. The derailleur according to claim 9 wherein the resistance control element engages the first movable end portion of the first spring member.

11. The derailleur according to claim 10 wherein the resistance control element comprises a second spring member.

12. The derailleur according to claim 11 further comprising a cam member that engages the second movable end portion of the first spring member.

13. The derailleur according to claim 12 wherein the cam member is manually operated.

14. The derailleur according to claim 10 wherein the resistance control element comprises a first cam member.

15. The derailleur according to claim 14 wherein the resistance control element comprises:
    a force sensor that senses a force applied by the resistance control element to the resistance applying element; and
    a regulating circuit that varies the force applied by the resistance control element to the resistance applying element in response to the force sensed by the force sensor.

16. The derailleur according to claim 15 wherein the resistance control element further comprises a motor that rotates the first cam member.

17. The derailleur according to claim 16 further comprising a second cam member that engages the second movable end portion of the first spring member.

18. The derailleur according to claim 17 wherein the second cam member is manually operated.

19. A bicycle derailleur comprising:
    a base member adapted to be mounted to a bicycle;
    a movable member movably coupled to the base member;
    a chain guide coupled to the movable member for rotation around a rotational axis;
    a resistance applying element that applies resistance to rotational movement of the chain guide; and
    a resistance control element that automatically applies a variable force to the resistance applying element;
    wherein the resistance control element applies the variable force to the resistance applying element in a direction that is non-parallel with the rotational axis.

20. The apparatus according to claim 19 wherein the resistance control element includes a spring element.

21. A bicycle derailleur comprising:
    a base member adapted to be mounted to a bicycle;
    a movable member movably coupled to the base member;
    a chain guide coupled to the movable member for rotation around a rotational axis;

a resistance applying element that applies resistance to rotational movement of the chain guide; and a resistance control element that automatically applies a variable force to the resistance applying element, wherein the resistance control element includes a sensor that senses the force applied to the resistance applying element, and wherein the resistance control element automatically applies the variable force to the resistance applying element in response to the force sensed by the sensor.

22. The derailleur according to claim 21 wherein the resistance control element further includes a regulating circuit operatively coupled to the sensor so that the regulating circuit controls the force applied to the resistance applying element in response to the force sensed by the sensor.

23. The derailleur according to claim 22 wherein the resistance applying member comprises a spring member.

24. The derailleur according to claim 23 wherein the resistance control element further includes:

a cam operatively coupled to the spring member; and a motor operatively coupled to the regulating circuit and to the cam so that the motor moves the cam in response to the force sensed by the sensor.

25. The derailleur according to claim 24 wherein the spring member extends circumferentially about the rotational axis and has a movable end portion, and wherein the cam applies a force to the movable end portion.

* * * * *